Dec. 6, 1960 W. STODIEK 2,962,929
MEASURING MICROSCOPE FOR NUCLEAR TRACKS
Filed April 3, 1956 5 Sheets-Sheet 1

INVENTOR.
Wolfgang Stodiek
BY Benj. T. Rauber
his attorney

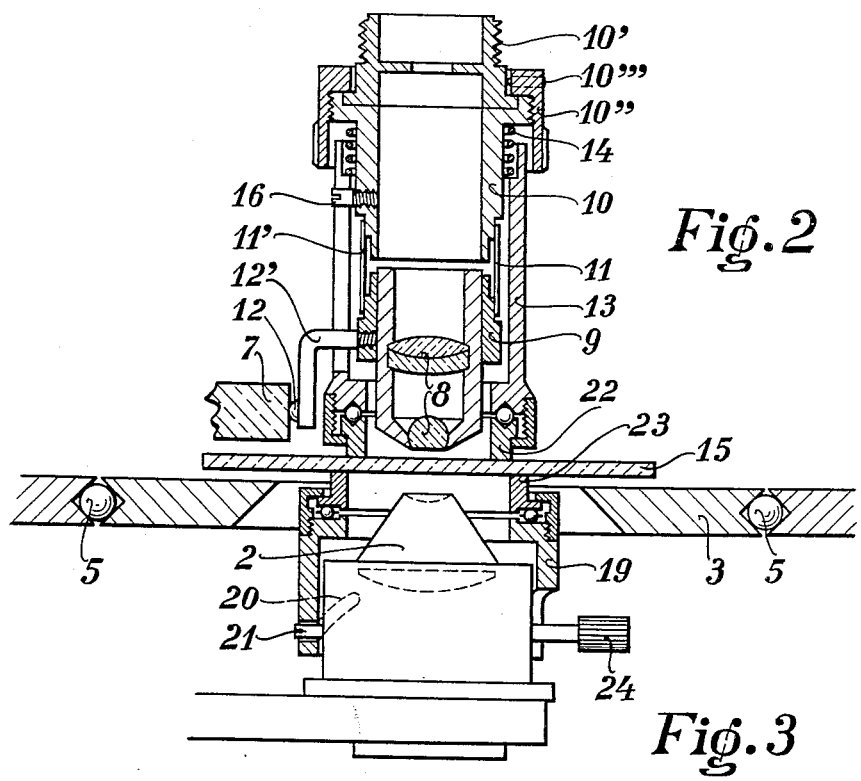

Dec. 6, 1960 W. STODIEK 2,962,929
MEASURING MICROSCOPE FOR NUCLEAR TRACKS
Filed April 3, 1956 5 Sheets-Sheet 3

INVENTOR.
Wolfgang Stodiek
BY Benj. T. Rauber
his attorney

Dec. 6, 1960 W. STODIEK 2,962,929
MEASURING MICROSCOPE FOR NUCLEAR TRACKS
Filed April 3, 1956 5 Sheets-Sheet 4

INVENTOR.
Wolfgang Stodiek
BY Benj. T. Rauber
his attorney

Dec. 6, 1960 W. STODIEK 2,962,929
MEASURING MICROSCOPE FOR NUCLEAR TRACKS
Filed April 3, 1956 5 Sheets-Sheet 5

INVENTOR.
Wolfgang Stodiek
BY Benj. T. Rauber
his attorney

United States Patent Office 2,962,929
Patented Dec. 6, 1960

2,962,929

MEASURING MICROSCOPE FOR NUCLEAR TRACKS

Wolfgang Stodiek, Gottingen, Germany, assignor to Ernst Leitz, G.m.b.H., Wetzlar, Lahn, Germany, a corporation of Germany Filed Apr. 3, 1956, Ser. No. 575,803

Claims priority, application Germany Apr. 7, 1955

19 Claims. (Cl. 88—39)

A frequent problem in microscopy is to investigate a microscopic object very exactly in regard to its linearity. The survey of the alignment of tracks of highly energetic particles in photographic emulsions is an example of this problem.

The deflection of a track from a straight line may be of the order of magnitude of a ten thousandth of a millimeter. The guiding of the photographic plate over a length up to several centimeters must be correspondingly exact and is very difficult to accomplish with ordinary means.

Since, moreover, the tracks in a plate may have various directions, it is advantageous that the apparatus permit a turning of the plate in its plane so that the track to be measured can be aligned with the direction of movement of the plate. No great demands need be made on the precision of the turning device except that, during the turning, the located point of the object should not move out of the optical axis.

My invention relates to an apparatus which meets the above requirements in a simple manner.

My invention provides a microscope that permits a relative movement between the optical system and the object and permits the object to be related to the optical system or one of its parts through a special guide bar which forms, in a plane normal to the optical axis, a coupling between the object and the optical system at a right angle to the guide bar or surface. With this arrangement there is obtained a measurement of the deflection of the track direction or the like from a straight line which is not influenced by any inexactitude in the guide rail of the microscope stage, because it is not the guide rail but the essentially more exact guide surface that acts as a reference line.

In one embodiment of the invention the objective of a microscope is joined with the microscope tube by means of a spring and a guide surface (arranged parallel to the direction of shifting of the object stage) on which the objective is pressed by the spring. The guide surface can, for example, be formed of a precision ground body of glass or metal and arranged for alignment with the object stage. The guide surface insures that during the shifting of the object stage no relative movement between the stage and the objective transverse to the direction of shifting can take place. This arrangement accomplishes a reduction of the influence of stage defects on the measurement by the factor of objective magnification.

A particular form of embodiment of the measuring microscope comprises arranging the objective in a collar which is combined by means of two leaf springs with a ring screwed onto the tube and is provided with a guide follower, for example, a steel ball, which can slide lengthwise on the guide surface.

A rear lens of the objective belonging to the optical system, or a tiltable plane parallel glass plate, can be coupled with the guide surface.

In a further form of embodiment of my invention a ruled plate is arranged sidewise on the spring mounted objective which is guided from the guide surface together with the objective. The light beam is conducted to the rule marks placed in the plane of the image of the ocular, by means of a tiltable mirror.

In a further embodiment of the invention an intermediate piece is supported on the object stage by means of springs on which the object can be mounted. A guide follower is arranged on the intermediate piece which is pressed against the objective or the tube or other fixed stationary part.

In a further embodiment the guide arrangement is combined with a mechanism which permits the turning of the object in its plane with the optical axis of the objective as its axis of rotation. For this purpose the spring mounted objective has a rotatable pressure collar which preferably is supported on balls. A second rotatable collar is fixed on the condenser. When the condenser is lifted the two pressure collars clamp the specimen plate between them so that it is easily turned together with the pressure collars. The pressure collar of the condenser can thereby be placed with a sidewise play. It is, however, not necessary that the turning arrangement be combined with spring mounted very strong objective but instead can also be combined with a special low power objective without spring mount which is interchangeable by means of a revolving nosepiece against the spring mounted objective.

The various features of my invention are illustrated by way of example in the accompanying drawings in which Fig. 1 is a side elevation of parts of a microscope embodying the invention;

Fig. 2 is a vertical section showing a spring mounting of the objective and the turning mechanism for the object;

Fig. 3 is a view of a setting means of the turning mechanism;

Fig. 4 is a vertical section of an element of the turning mechanism;

Figure 1:
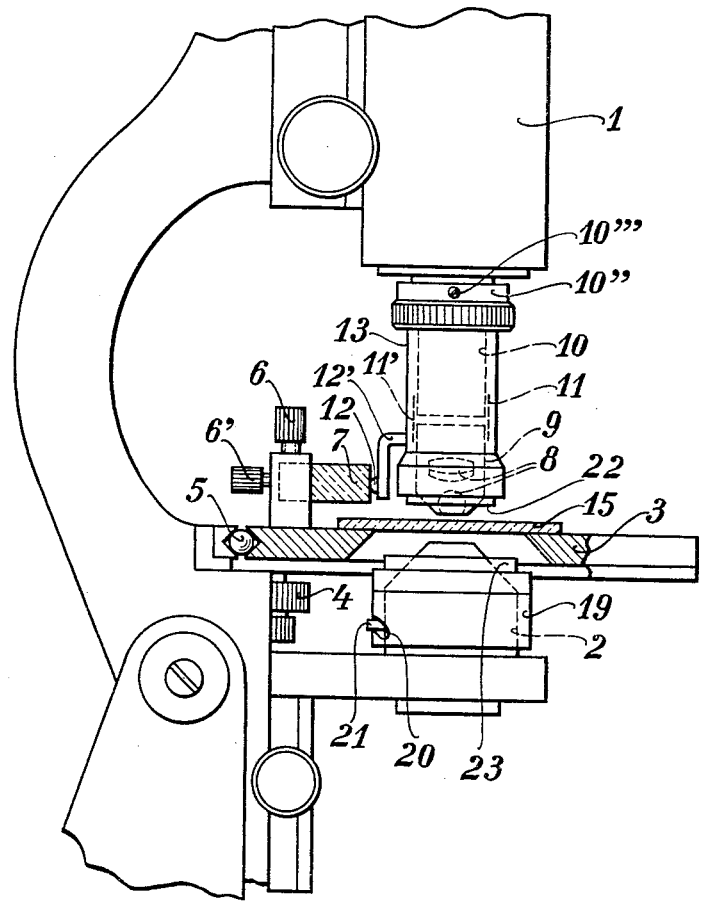

In the embodiment shown in Fig. 1 a microscope mounting is shown with a tube 1 and a vertically movable condenser 2. An object stage 3 is movable vertically to the drawing plane by the usual gear drive 4 or by a micrometer screw in the ball bearing 5. On the object stage there is fixed by means of fastening and adjusting screws 6 and 6' a guide element or bar 7, for example, a plate of glass or steel. The objective 8 is, as shown in Fig. 2, mounted in a collar 9 which is joined with a part 10 by means of two vertical leaf springs 11, 11', and has a ball 12 as a guide follower which is pressed against the guide element 7 by the springs. In order that the ball 12 can be positioned against the guide element, the part 10 is rotatably connected to the tube by means of a ring 10' and fixed in position by the nut 10'' and the set screw 10'''. The objective can be enclosed in a second collar 13, as shown in Fig. 2, which is pressed toward the object 15 by the spring 14. A bayonet latch 16, 17 (Fig. 3) enables the collar 13 to be fixed in raised position. An opening 18 permits the rotation of the collar 13 required for latching without forming an obstacle for the rod 12' carrying the guide follower 12. A similar collar 19 with latching elements 20, 21, is provided for the condenser. The collar 13 carries a ring 22 rotatable in a ball bearing and the collar 19 a similar ring 23. If one lowers the collar 13 until the ring 22 rests on the object 15 and displaces the condenser upward with the customary drive 24, the ring 23 lifts the object 15 from the table against the force of the spring 14 so that the object is clamped between the rings 22 and 23 and is easily rotated with them. One can then turn the object i.e. the track plate 15 under observation through the microscope so that the nuclear track to be measured falls into the direction of the stage movement. Then one lowers the condenser whereby the plate 15 again lies on the object stage 3 and raises the collar 13 against the pressure of the spring 14 and latches it with the bayonet catch 16, 17.

In the embodiment of Fig. 4 a ring 23 is mounted in a collar 19 with sidewise play by means of springs 23' so that the axis of rotation of the rings 23 adjusts itself automatically to the axis of rotation of the ring 22.

Figure 5:
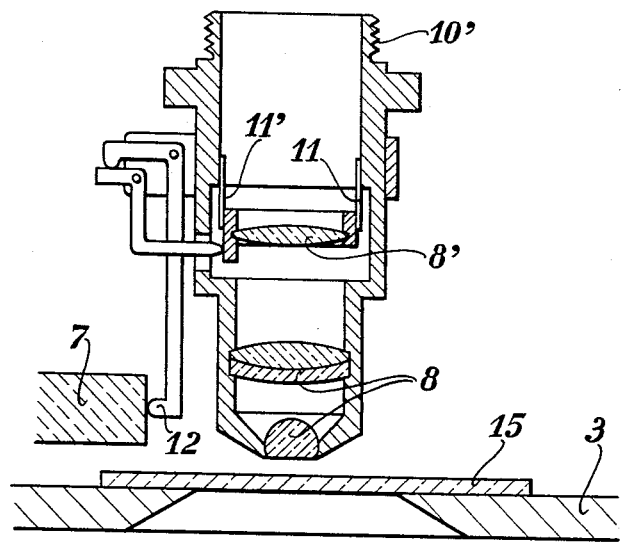
Fig. 5 is a vertical section of an objective with a guided rear lens.

In the embodiment of Fig. 5 a rear element 8' is movably secured by means of springs 11 and 11' to an objective fixed on the tube and guided by a guide-element 7.

Figure 6:
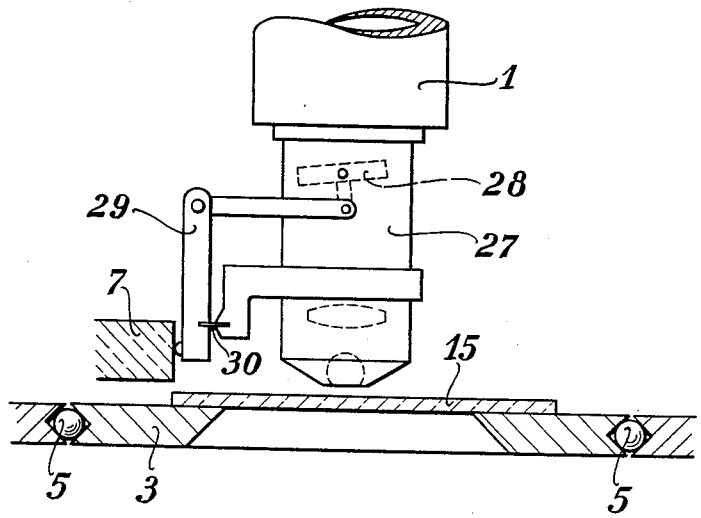
Fig. 6 is an illustration of an embodiment with a tiltable plane plate.

In Fig. 6 the objective 27 is provided with a tiltable plane glass plate 28 which is connected with the guide-element 7 by a lever system 29 mounted in a spring fulcrum 30.

Figure 7:
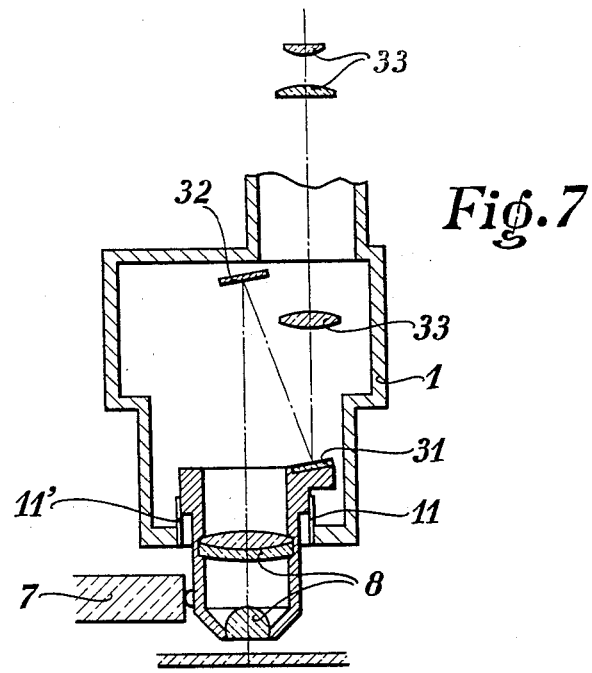
Fig. 7 is a vertical section of an ocular ruling carrier guided together with an objective.

In Fig. 7 the objective 8 is mounted on the tube 1 by means of springs 11, 11'. With the objective is combined a graduated mirror 31 to which the light beam is reflected by a mirror 32. The graduated mirror is in the image plane of the ocular 33.

Figure 8:
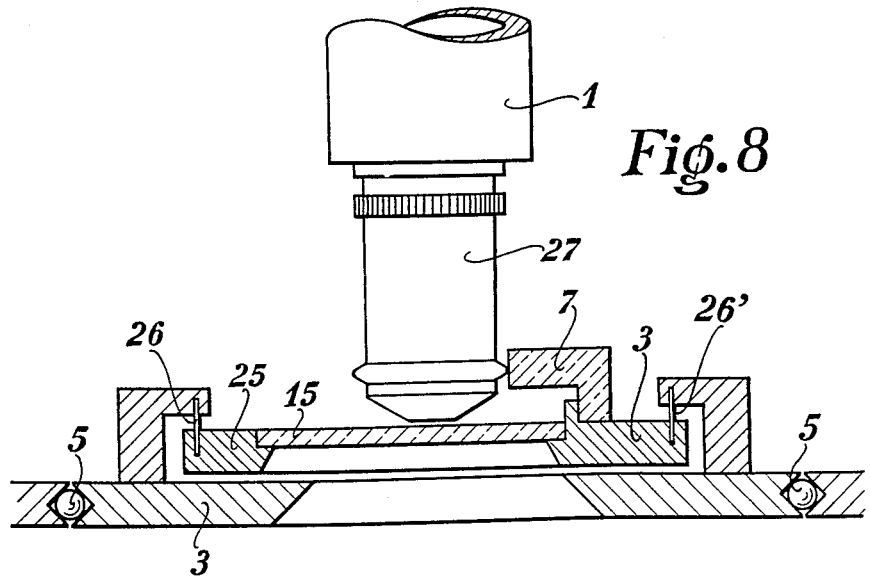
Fig. 8 is a vertical section of an object stage with a guided intermediate piece.

In Fig. 8 an intermediate element 25 is mounted on the object stage by means of springs 26, 26' which serves to receive the object particularly the nucleus plate 15 and carries the guide-element 7 which bears against an immovable part of the microscope, for example, the objective 27.

In all forms of embodiment the inexactitude of the ball bearing of the object stage is compensated by guiding on the precison guide element.

Figure 9:
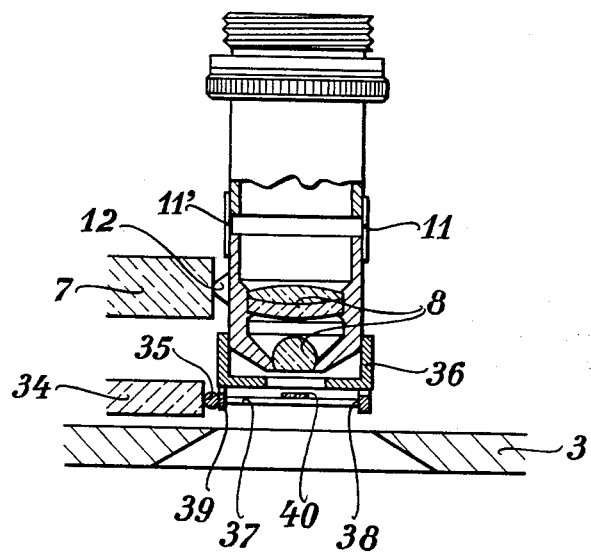
Figs. 9 and 10 show apparatus for testing and calibration.
Figure 10:
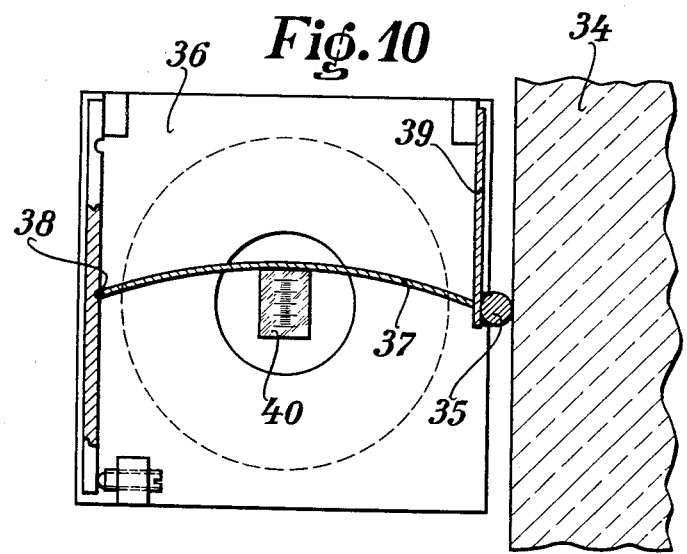

Figs. 9 and 10 show arrangements for testing and calibrating the measuring microscope. In addition to the guide-element the object stage 3 is combined with a second special detachable guide-element 34. On the objective is mounted a cap 36 which carries a slightly bent leaf spring 37. The leaf spring is secured at one end 38 while its other end is held by the spring 39 and through the guide body 35 lies against the guide element 34. In the middle of the leaf spring 37 is placed a lightly graduated carrier. The bowed leaf spring 37 forms a mechanical enlarging or magnifying system which magnifies on the graduation 40 any movement of the guide-element 35 so that it is recognizable in the microscope. This movement corresponds to the difference of the deviations of the guide-elements 7 and 34.

Having described my invention, what I claim is:

1. A microscope for measuring nuclear tracks in a nuclear track plate which comprises an object stage movable in a plane transverse to the optical axis of the microscope objective, a guide bar rigidly fixed to said stage and having a guide surface parallel to the direction of movement of said stage and perpendicular to the plane of movement of said stage, on objective tube, an objective element and a spring mounting of the objective element on said microscope tube to provide a resilient pressure for said tube against the surface of said guide bar.

2. The microscope of claim 1 comprising a collar attachable to the microscope, a pair of leaf springs securing the objective to the collar to permit movement of the objective transverse to the movement of the surface of the guide bar and a guide follower secured to the objective to contact surface of said guide bar.

3. The microscope of claim 2 in which said follower has a ball bearing on the guide bar.

4. The microscope of claim 1 in which said objective element is positioned within the objective, with a said spring mounting of said element on the objective.

5. The microscope of claim 5 in which the objective element comprises a plane parallel glass plate mounted to tilt about an axis parallel to the guide surface and a lever to tilt said plate and having a guiding contact with said guide surface.

6. The microscope of claim 1 having a graduated rule in the optical system guided by said guide bar.

7. The microscope of claim 6 in which the graduated rule is fixed to the spring mounted objective element and having a reflecting mirror to deflect the light beam to the rule.

8. The microscope of claim 1 having an intermediate spring mounted element on the object stage to permit movement transverse to the guide surface and carrying said guide bar along a fixed objective.

9. The microscope of claim 1 having a collar surrounding the objective, a rotatable pressure ring on the end of said collar, a condenser having a collar and a rotatable pressure ring opposed to the pressure ring of the objective collar and a spring pressing one of said collars toward the other to grip a specimen plate between the pressure rings.

10. The apparatus of claim 1 comprising a second guide bar combined with the guide bar of the microscope stage, an indicating rule carried by a mechanical magnifying mechanism contacting said second bar.

11. The apparatus of claim 10 in which the magnifying mechanism comprises a bowed leaf spring secured to one end and having the other end bearing against the second guide element and carrying the rule.

12. A microscope for measuring nuclear tracks in a nuclear track plate which comprises an object stage, guiding and supporting rails to support said object stage in linear movement in a plane transverse to the optical axis of the microscope objective, a guide bar mounted in fixed position on the object stage and having a precision surface parallel to the linear movement of said object stage, and perpendicular to the plane of movement of said stage, and an objective element movable transversely of said precision surface and springs pressing said objective element into contact with said precision surface.

13. A microscope for measuring nuclear tracks in a nuclear track plate, said microscope having an optical system, an object stage movable in a rectilinear direction in a plane transverse to the optical axis of said optical system, a guide element having a plane guide surface perpendicular to the plane of said object stage extending parallel to the direction of movement of said object stage and a spring pressing said guide surface of said guide element and an element of said optical system into sliding contact to hold the optical axis of said microscope at a uniform distance from said guide surface during movement of said object stage.

14. The microscope of claim 13 in which said element of said optical system is an objective and in which said optical system comprises a fixed support and in which said objective is supported on said fixed support by said spring.

15. The microscope of claim 13 in which said element of said optical system is a lens back of the objective and in which said optical system comprises a fixed support and in which said objective is supported on said fixed support by said spring.

16. Th microscope of claim 13 in which said element of said optical system is a plane glass plate tiltably mounted in the optical path of said optical system and in which said microscope comprises a lever system actuating the tilting of said plate and pressed into contact with said guide surface by said spring.

17. The microscope of claim 13 in which said object stage and said guide element are mounted by said spring to be deflected transversely of the rectilinear movement of said object stage.

18. The microscope of claim 13 having an optical mounting means supporting said stage and supporting said optical system to rotate about and to move lengthwise of its optical axis, said stage having an opening to be spanned by an object to be studied, a rotating device below said opening having a portion mounted on said optical mounting means for rotation around the optical axis of said microscope, means for clamping said rotating device portion to said object being studied while said object is mounted on said translatable stage so that said object can be separated from said translatable stage and supported by said rotating device, and means for moving said rotating device portion axially of said optical axis, relative to said stage carrying said object off said stage so that it can thereupon be rotated upon rotation of said rotating device.

19. In a microscope having optical mounting means the combination of: a translatable stage for mounting thereon an object to be studied; a rotating device having a portion mounted on said optical mounting means for rotation around the optical axis of said microscope; means for clamping said rotating device portion to said object being studied while said object is mounted on said translatable stage so that said object can be separated from said translatable stage and supported by said rotating device; and means for moving said rotating device portion axially of said optical axis, relative to said stage carrying said object off said stage so that it can thereupon be rotated upon rotation of said rotating device.

References Cited in the file of this patent
UNITED STATES PATENTS

| | | |
|---|---|---|
| 775,934 | Patterson | Nov. 29, 1904 |
| 1,488,564 | Steinle | Apr. 1, 1924 |
| 2,034,110 | Mechau | Mar. 17, 1936 |
| 2,256,245 | Fricke | Sept. 16, 1941 |
| 2,433,452 | Harper | Dec. 30, 1947 |
| 2,535,128 | Gallasch | Dec. 26, 1950 |
| 2,703,505 | Senn | Mar. 8, 1955 |
| 2,764,061 | Kinder et al. | Sept. 25, 1956 |
| 2,764,908 | Hendrix et al. | Oct. 2, 1956 |
| 2,775,918 | McLeod | Jan. 1, 1957 |